(12) United States Patent
Kitani et al.

(10) Patent No.: US 8,567,858 B2
(45) Date of Patent: Oct. 29, 2013

(54) VEHICLE SUNSHADE

(75) Inventors: Takashi Kitani, Nagoya (JP); Kazuhiko Yoshizawa, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/822,644

(22) PCT Filed: Sep. 22, 2011

(86) PCT No.: PCT/JP2011/071717
§ 371 (c)(1),
(2), (4) Date: Mar. 13, 2013

(87) PCT Pub. No.: WO2012/043412
PCT Pub. Date: Apr. 5, 2012

(65) Prior Publication Data
US 2013/0181488 A1    Jul. 18, 2013

(30) Foreign Application Priority Data

Sep. 27, 2010 (JP) .................................. 2010-215127

(51) Int. Cl.
*B60J 3/02*     (2006.01)
*B60J 7/043*    (2006.01)

(52) U.S. Cl.
USPC ...................................... 296/214; 296/216.08

(58) Field of Classification Search
USPC .......................................... 296/214, 216.08
See application file for complete search history.

(56) References Cited

U.S. PATENT DOCUMENTS

| | | | |
|---|---|---|---|
| 6,899,380 B2* | 5/2005 | Kralik et al. | 296/214 |
| 2004/0075304 A1* | 4/2004 | Cocaign | 296/214 |
| 2011/0204682 A1 | 8/2011 | Kamei et al. | |

FOREIGN PATENT DOCUMENTS

| | | |
|---|---|---|
| JP | 5-185839 | 7/1993 |
| JP | 2000-16331 | 1/2000 |
| JP | 2009-83822 | 4/2009 |
| WO | WO 2010/024025 A1 | 3/2010 |
| WO | WO 2010/106767 A1 | 9/2010 |

OTHER PUBLICATIONS

International Search Report in International Application No. PCT/JP2011/071717; Mailing Date: Dec. 27, 2011.

* cited by examiner

*Primary Examiner* — Dennis Pedder
(74) *Attorney, Agent, or Firm* — Finnegan, Henderson, Farabow, Garrett & Dunner, LLP

(57) ABSTRACT

A sunshade for a vehicle includes a plastic panel configuring a part of a roof of the vehicle and including a translucent portion, a shading sheet for unshading and shading the translucent portion, a pair of guide rails, which are fixed to the panel to face each other and extend in an opening-and-closing direction of the sheet to hold the sheet in a manner permitting the sheet to be opened and closed, a roll-up member for rolling up the sheet, a frame, which extends in a facing direction of the rails, that links the rails and holds the roll-up member, an elongated hole, which is formed in end portions of the frame and extends in the facing direction, and an engaging member inserted into the hole. The engaging member engages with the rails and the frame to permit relative movement of the rails and the frame in the facing direction.

6 Claims, 4 Drawing Sheets

VEHICLE SUNSHADE

CROSS-REFERENCE TO RELATED APPLICATIONS

This application is a national phase application of International Application No. PCT/JP2011/071717, filed Sep. 22, 2011, and claims the priority of Japanese Application No. 2010-215127, filed Sep. 27, 2010, the content of both of which is incorporated herein by reference.

FIELD OF THE INVENTION

The present invention relates to a sunshade for a vehicle, which opens and closes to selectively shade light through a transparent plastic panel provided on a roof of the vehicle.

BACKGROUND OF THE INVENTION

In one example, a roof of a vehicle is reinforced by a reinforcing member that extends in a vehicle width direction and is curved in accordance with a shape of the roof. The reinforcing member is adhered and fixed to the roof. More specifically, the opposite ends of the reinforcing member are fastened by bolts. A bolt fixation hole is provided in each of the opposite ends of the reinforcing member. The bolt fixation holes are elongated holes that extend in a longitudinal direction of the reinforcing member, and therefore allow the position of the reinforcing member to be adjusted in the longitudinal direction when mounting the reinforcing member (for example, refer to Patent Document 1).

In another example, a sunroof includes a sunroof decorative member, which is a rail extending in the running direction of a vehicle, and a bracket for fixing the decorative member to the vehicle body. An elongated hole in the running direction of the vehicle is formed in the bracket to regulate the position of the sunroof decorative member. Since the position of a decorated cover is regulated by the elongated hole, a molding error is tolerated and influence of thermal deformation is permitted as well (for example, refer to Patent Document 2).

PRIOR ART DOCUMENT

Patent Document

Patent Document 1: Japanese Laid-Open Patent Publication No. 2000-16331
Patent Document 2: Japanese Laid-Open Patent Publication No. 2009-83822

SUMMARY OF THE INVENTION

In Patent Document 1, however, since the reinforcing member is fixed by fastening a bolt and adhesion, there is a problem that an influence caused by thermal deformation, for example, cannot be tolerated after the reinforcing member is mounted, although the position of the reinforcing member can be adjusted when mounting the reinforcing member.

In Patent Document 2, since the elongated hole, which extends in the vehicle running direction, is provided, there is a problem that displacement in a direction perpendicular to the direction in which the rails extend caused by thermal deformation, for example, cannot be permitted.

In order to eliminate the above mentioned problems, an object of the present invention is to provide a vehicle sunshade that is fixed to a plastic panel to tolerate the influence of displacement of the rails in a direction perpendicular to the direction in which the rails extend (namely, in a direction in which a pair of rails face each other) caused by environmental change.

According to one aspect of the present invention, a vehicle sunshade is provided. The vehicle includes a roof. The vehicle sunshade includes: a plastic panel, a shading sheet, a pair of guide rails, a roll-up member, a frame, an elongated hole, and an engaging member. The plastic panel configures at least a part of the roof of the vehicle and includes a translucent portion. The shading sheet unshades and shades the translucent portion of the plastic panel. The pair of guide rails is fixed to the plastic panel so that the guide rails face each other and extend in an opening-and-closing direction of the shading sheet to hold the shading sheet in a manner permitting it to be opened and closed. The roll-up member rolls up the shading sheet. The frame, which extends in a facing direction of the guide rails, links the guide rails to each other and holds the roll-up member. The elongated hole is formed in at least one of end portions of the frame in the facing direction of the guide rails and extends at least in the facing direction of the guide rails. The engaging member is inserted into the elongated hole and engages with the guide rails and the frame to permit relative movement of the guide rails and the frame at least in the facing direction of the guide rails.

DETAILED DESCRIPTION OF THE PREFERRED EMBODIMENTS

Hereinafter, a motor vehicle including a sunshade according to the present invention will be described.

Figure 1:
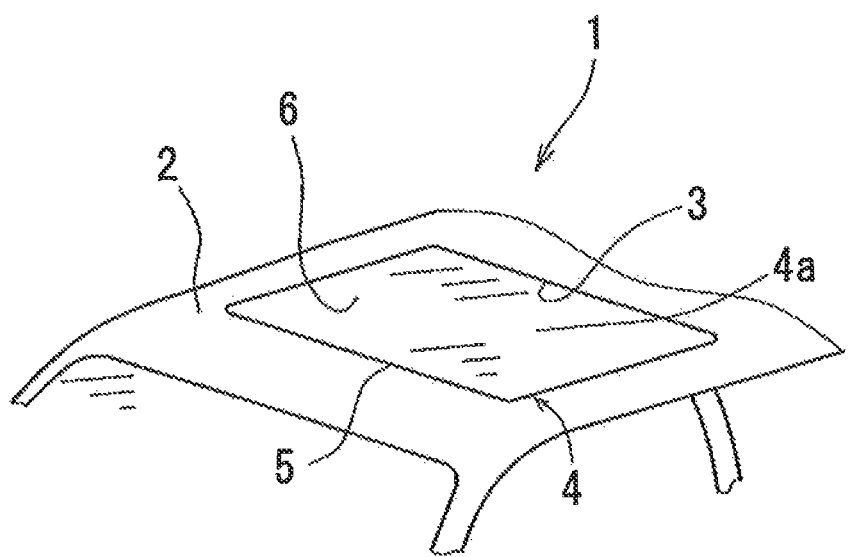
FIG. 1 is a perspective view illustrating a roof of a motor vehicle, on which a sunshade according to an embodiment of the present invention is installed.

FIG. 1 is a perspective view illustrating a roof 1 of a motor vehicle, on which a sunshade according to one embodiment of the present invention is installed. An opening 3 is provided in a roof panel 2, which forms the roof 1, to introduce sunlight therethrough. In the opening 3, a plastic panel 4, which is molded from a transparent plastic and has a translucent portion 4a, is provided. A sealing member (not shown) is provided on an outer peripheral edge portion 5 of the plastic panel 4 to prevent rain water from seeping into the passenger compartment. A sunshade 11 (sunshade for a vehicle) shown in FIG. 2 is provided on a surface 6 of the plastic panel 4 on the passenger compartment side to let in or shade light through the translucent portion 4a by opening or closing the sunshade 11.

Figure 2:
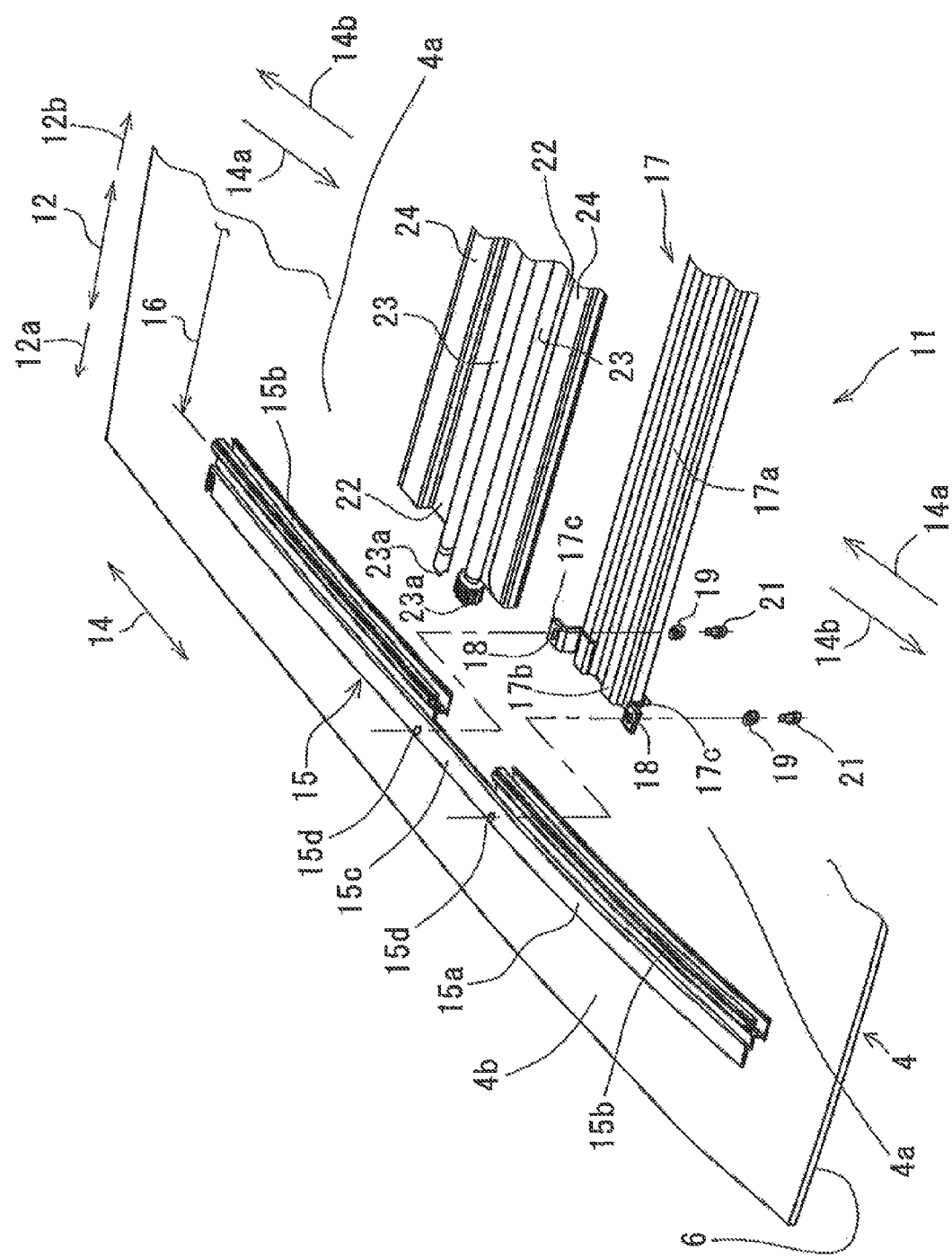
FIG. 2 is an exploded perspective view illustrating a left half of the sunshade according to the embodiment of the present invention.

FIG. 2 is an exploded perspective view illustrating a left half of the sunshade 11 according to the embodiment of the present invention when facing forward of the motor vehicle. Since a right half of the sunshade 11 when facing forward of the motor vehicle is configured to be symmetrical with the left half, description thereof will be omitted. A pair of guide rails 15 is provided on the surface 6 of the plastic panel 4 at opposite panel end portions 4b in a vehicle width direction 12. The guide rails 15 are spaced at an interval of a rail pitch 16 in the vehicle width direction 12 and extend along a vehicle longitudinal direction 14. In the present embodiment, a direction in which the guide rails 15 face each other corresponds to the vehicle width direction. Each of the guide rails 15 is provided with a rail flange portion 15a and two rail portions 15b. The two rail portions 15b are symmetrical in the vehicle longitudinal direction 14 with respect to a rail central portion 15c (a central portion in the extending direction). The guide rails 15 are coupled to each other by a frame 17 extending in the vehicle width direction 12 in the vicinity of the rail central portion 15c of each of the guide rails 15. The frame 17 is configured by a frame body portion 17a, which is formed by pressing a steel plate and extends in the vehicle width direction 12, and two pairs of frame brackets 17c. Each pair of the frame brackets 17c is welded and fixed to one of end portions 17b of the frame 17. An elongated hole 18, which extends in the vehicle width direction 12, is formed in each of the frame brackets 17c. A stepped screw 21, which fits into a plastic collar 19, is inserted into the elongated hole 18. The stepped screw 21 functions as an engaging member. Each frame bracket 17c is fastened to the rail flange portion 15a by screwing the stepped screw 21 into a screw hole 15d near the rail central portion 15c. Further, a pair of retractors 23 is provided between the plastic panel 4 and the frame 17 to roll up shading sheets 22. The retractors 23 face each other in the vehicle longitudinal direction 14. The retractors 23 function as roll-up members. The retractors 23 are bar-like core members extending in the vehicle width direction 12. One of the edges of each shading sheet 22 in the vehicle longitudinal direction 14 is fixed to the corresponding retractor 23, which serves as a core member. Shaft ends 23a of each retractor 23 are rotationally supported by the frame 17 via bearings (not shown). Each retractor 23 is constantly urged by, for example, a spiral spring (not shown) to roll up the shading sheet 22 in a closing direction 14b. A garnish 24, which also serves as an operation portion, is provided on the other one of the edge portions of each shading sheet 22. The garnish 24 functions as a moving member to hold the shading sheets 22 on the guide rails 15 so that the shading sheets 22 can be opened and closed. In the present embodiment, an opening-and-closing direction of the shading sheet 22 corresponds to the vehicle longitudinal direction.

Figure 3:
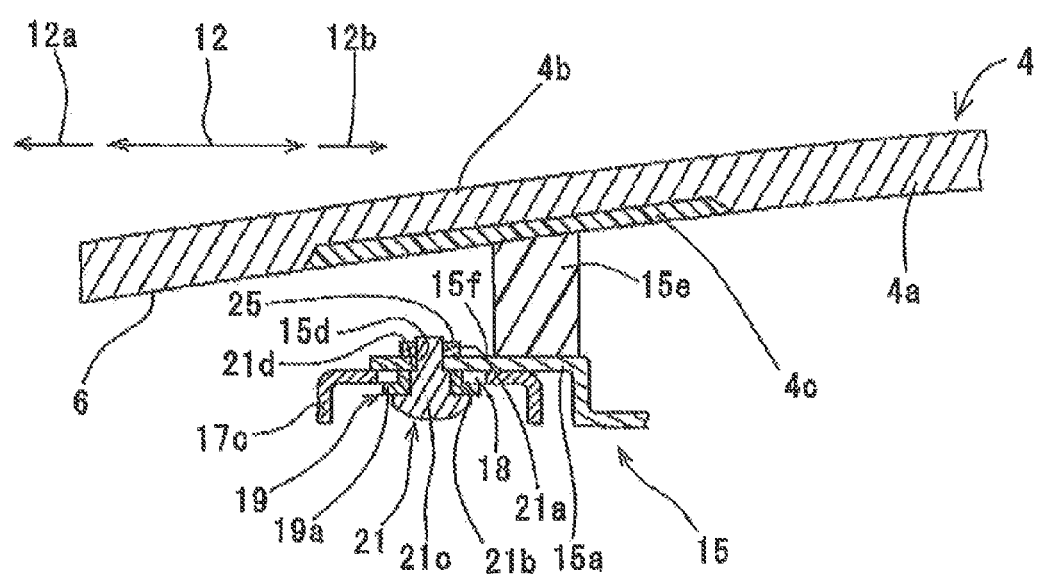
FIG. 3 is a partial cross-sectional view illustrating a frame attaching part in the vehicle width direction according to the embodiment of the present invention.

FIG. 3 is a partially cross-sectional view illustrating a mounted state of the frame 17 in the vehicle width direction 12 according to the embodiment of the present invention. The plastic panel 4 is provided with a black molded portion 4c for shielding the guide rails 15 from outside. Each rail flange portion 15a of the guide rail 15 is adhered and fixed to the panel end portion 4b of the plastic panel 4 with light resistant adhesive from the surface 6 on the passenger compartment side with a rail spacer 15e in between. The rail flange portion 15a has the screw holes 15d, and weld nuts 25 are welded and fixed to the rail flange portion 15a from a flange upper surface 15f opposite to a surface of the rail flange portion 15a to which the frame brackets 17c are fastened. The stepped screw 21 includes a screw portion 21a and a stepped portion 21b below the screw portion 21a. The stepped portion 21b has a diameter greater than a nominal diameter of the screw portion 21a. The plastic collar 19, which is cylindrical, engages with the stepped portion 21b. The stepped screw 21, with which the plastic collar 19 engages, is inserted into the elongated hole 18 of the frame bracket 17c. The screw portion 21a of the stepped screw 21 is screwed into the weld nut 25 of the guide rail 15 and generates axial force by being fastened. The plastic collar 19 has a collar flange portion 19a, and the collar flange portion 19a is pressed by the axial force of the stepped screw 21 between a screw head 21c and the frame bracket 17c. A stepped portion edge surface 21d of the stepped screw 21 contacts and presses the rail flange portion 15a to maintain the axial force of the stepped screw 21.

Figure 4:
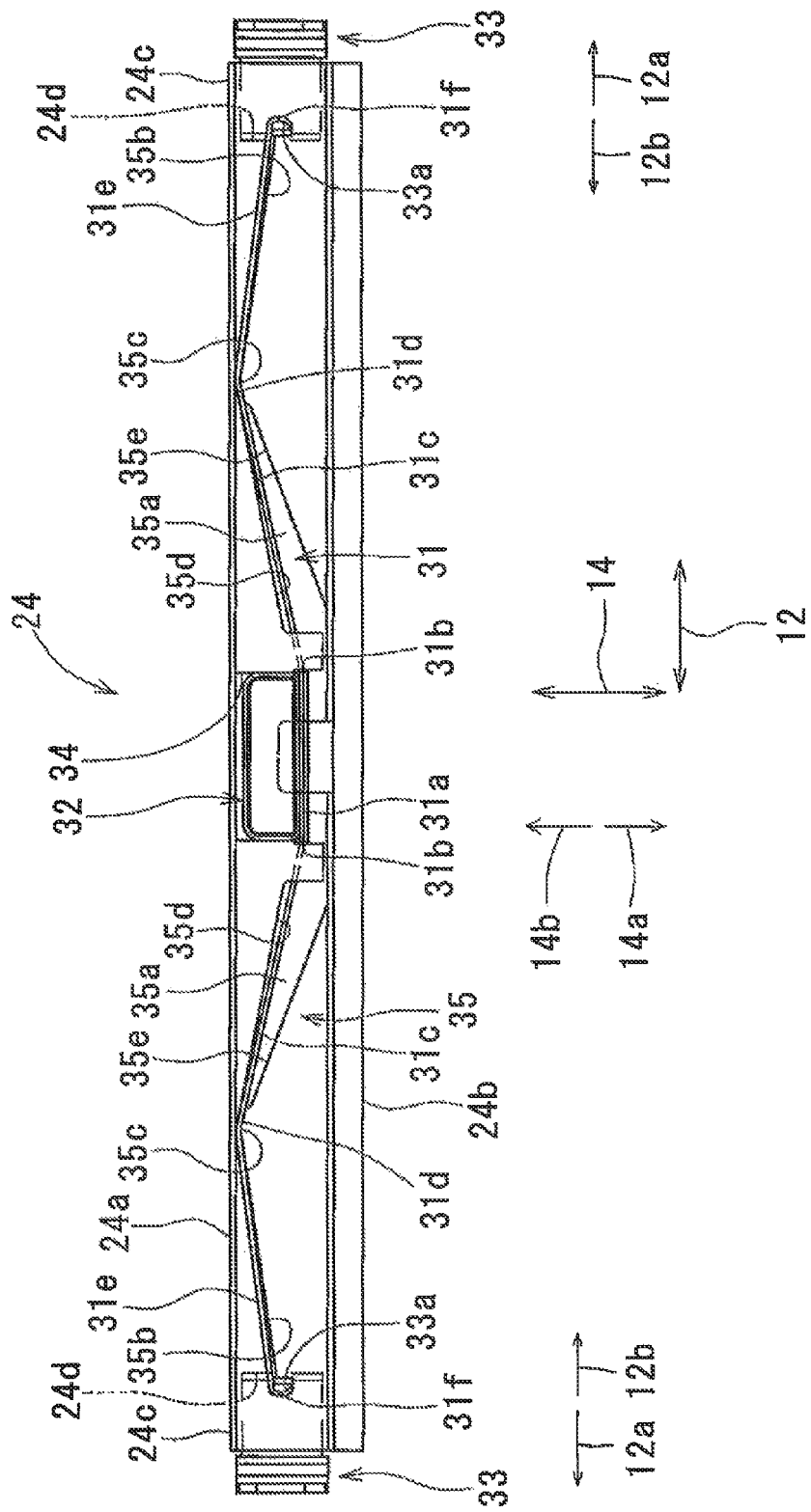
FIG. 4 is a plan view showing a garnish according to the embodiment of the present invention.

FIG. 4 is a plan view showing the garnish 24 according to the embodiment of the present invention. The garnish 24 is molded from plastic and includes a rectangular shape extending in the vehicle width direction 12. The garnish 24 includes a flexural spring 31, which functions as an urging member, an operation button 32, and a pair of shoes 33. Each shoe 33 fits into the rail portion 15b to hold the garnish 24 with respect to the guide rail 15 in a slidable manner. The long sides of the garnish 24 are a first edge portion 24a and a second edge portion 24b, respectively. The second edge portion 24b is joined to an edge portion of the shading sheet 22. A central recessed portion 34 is formed in a central portion of the garnish 24. The operation button 32 is provided in the central recessed portion 34 to be slidable in the vehicle longitudinal direction 14. A groove 35, which extends in the vehicle width direction 12 and is symmetrical with respect to the central recessed portion 34, is provided in the garnish 24 to accommodate the flexural spring 31. The groove 35 is configured by a pair of first groove portions 35a and a pair of second groove portions 35b. The first groove portions 35a are in communication with the central recessed portion 34 and extend from portions of the second edge portions 24b in the vicinity of the central recessed portion 34 to portions near opposite end portions 24c of the first edge portion 24a, respectively. The pair of second groove portions 35b is in communication with the first groove portions 35a and reaches the end portion 24c of the garnish 24. Each first groove portion 35a and the corresponding second groove portion 35b form an obtuse angular portion 35c with each other. The width of the first groove portion 35a in the vehicle longitudinal direction 14 linearly decreases from the central recessed portion 34 to the angular portion 35c since a first groove wall 35d on a rear side of the first groove portion 35a and a second groove wall 35e on a front side of the first groove portion 35a form an angle. A recessed shoe holder 24d opening outwardly in the vehicle width direction 12 is formed in each end portion 24c of the garnish 24 to moveably hold the corresponding shoe 33 in the vehicle width direction 12 and in communication with the second groove portion 35b. The flexural spring 31, which is accommodated in the groove 35, is formed from a plate spring steel and configured symmetrically in the vehicle width direction 12 by a central portion 31a on which the operation button 32 is provided, a pair of first extended portions 31c connected to the central portion 31a by first flexural portions 31b, and a pair of second extended portions 31e connected to the corresponding first extended portions 31c by second flexural portions 31d. Each first extended portion 31c contacts the first edge portion 24a to form an acute angle. Each second extended portion 31e also contacts the first edge portion 24a to form an acute angle. The first extended portion 31c and the second extended portion 31e form an obtuse angle. A hook portion 31f is provided at an end of each of the second extended portions 31e to cooperate with the corresponding shoe 33. Each hook portion 31f of the flexural spring 31 fits into a shoe groove portion 33a. When the sunshade 11 is completely opened or stopped to maintain a degree of an opened state thereof, the flexural spring 31 flexes in accordance with the shape of the groove 35 so that the first extended portion 31c is maintained in a state urged toward the first groove wall 35d. Accordingly, the urging force as reaction force against restorative force toward the first groove wall 35d operates from the first extended portion 31c to the second extended portion 31e so that the shoe 33 is urged toward the guide rail 15 in an outer direction 12a. Since the opposite end portions 24c are held via the shoes 33 with respect to the guide rails 15, the garnish 24 is centered toward an inner direction 12b with respect to the guide rails 15.

When opening the sunshade 11, the operation button 32 is slid in an opening direction 14a to move the central portion 31a of the flexural spring 31 toward the second edge portion 24b against the urging force so that the first extended portion 31c flexes at the angular portion 35c as a pivot. According to the flexion of the first extended portion 31c, the second flexural portion 31d moves in the inner direction 12b so that the second extended portion 31e is drawn in the inner direction 12b along the second groove portion 35b. The urging force of the shoe 33 in the outer direction 12a is relieved according to the movement of the second extended portion 31e so that the garnish 24 can be moved. Then, the garnish 24 is manually slid in the opening direction 14a along the guide rails 15. In this case, the shading sheets 22 are rolled up by the corresponding retractors 23 to let in light through the translucent portion 4a.

When closing the sunshade 11, the garnish 24 is manually slid in a closing direction 14b. In this case, the shading sheets 22, which have been rolled up by the retractors 23, are pulled out and unwound by the garnish 24 to shade the translucent portion 4a. In a completely closed state, the garnish contacts a stopper (not shown) to be stopped.

In a case where the sunlight is directly incident on the plastic panel 4 so that the plastic panel 4 is thermally expanded, since each of the guide rails 15 is adhered and fixed to the plastic panel 4, the rail pitch 16 between the guide rails 15 is elongated. Since the linear expansion coefficient of plastic is greater than that of a steel plate, relative displacement is caused in a fastened portion between the guide rail 15 fixed to the plastic panel 4 and the frame bracket 17c welded and fixed to the frame body portion 17a molded from the steel plate. Accordingly, each stepped screw 21, the position of which is fixed relative to the guide rail 15, moves along the elongated hole 18 of the frame bracket 17c, and the plastic collar 19, which is pressed by the stepped screw 21, slides with respect to the frame bracket 17c. Since the bearing portion holding the shaft end portion 23a of the retractor 23 is provided on the frame 17, which is formed from a steel plate with smaller linear expansion coefficient, the amount of deformation of the bearing portion in the vehicle width direction 12 is small even if an environment such as heat is changed. Accordingly, the bearing portion maintains its bearing function. The amount of flexion of the flexural spring 31 accommodated in the garnish 24 changes according to the elongation of the rail pitch 16 so that the shoes 33 follow the corresponding guide rails 15, and the centering of the garnish 24 is maintained.

The above embodiment has the following advantages.

In the sunshade 11 of the present invention, the frame 17 is fastened to the guide rails 15 by inserting the stepped screws 21 into the elongated holes 18, which extend in the vehicle width direction 12, or in the facing direction of the guide rails 15. Accordingly, even if the plastic panel 4 is deformed, for example, expanded due to an environmental change such as heat, the stepped screw 21 relatively moves along the elongated hole 18 to compensate for a change of the distance between the guide rails 15. Further, flexural deformation of the plastic panel 4 due to the difference in the linear expansion coefficients is reduced. Also, breakage of the plastic panel 4 or an adhered portion due to thermal fatigue is restricted, and water leakage caused by exfoliation of a waterproof seal of the outer peripheral edge portion 5 of the plastic panel 4 due to the flexural deformation is restricted. Moreover, the frame 17 and the plastic panel 4 can be formed from materials with different linear expansion coefficients. Accordingly, choices of the materials upon design are increased, and the sunshade 11 and the plastic panel 4 can be assembled as a unit, which facilitates mounting to the vehicle. Furthermore, since the bearing portions of the shaft end portions 23a of the retractors 23 are provided not on the guide rails 15 but on the frame 17 with less deformation amount, a follower mechanism of the bearing portion corresponding to the deformation of the plastic panel 4 is not necessary. Accordingly, the number of elements is reduced so that the structure is simplified.

Since the frame 17, which holds the retractors 23, engages with the rail central portion 15c of each of the guide rails 15, the single frame 17 can hold two of the retractors 23 even if the translucent portion 4a is wide and two of the shading sheets 22 are necessary. Accordingly, the number of the frame 17 can be reduced. Further, reduction in the number of the frame 17 as heavy load arranged on the roof 1 lowers the center of gravity so that the translucent portion 4a of the sunshade 11 can be widened without compromising running performance and smooth ride of the motor vehicle.

It is not necessary to provide two of the frames 17 in front of and behind the guide rails 15. Also, the frame 17, which is relatively thick, does not protrude at a position in front of and over the head of the driver. Thus, not only visibility and safety are improved, but also oppressive feeling is removed and comfort is improved. Moreover, the direction in which the elongated hole 18 extends is restricted to only the vehicle width direction 12 so that backlash in the vehicle longitudinal direction 14 can be advantageously restricted. Accordingly, accuracy of mounting the sunshade 11 such as the rail pitch 16 is improved, achieving a smooth operability and luxuriousness.

Since the garnish 24 is urged toward the guide rail 15 by the flexural spring 31, the centering of the garnish 24 is maintained even if the guide rail 15 is displaced in the vehicle width direction 12 due to environmental change such as heat. Accordingly, the garnish 24 is prevented from being deviated in the vehicle width direction 12. Excellent operability is therefore maintained.

The frame 17 is fastened to the guide rails 15 via the plastic collars 19 by the stepped screws 21. Accordingly, when the frame 17 and the guide rails 15 are moved relative to each other, the plastic collars 19 slide to reduce sliding resistance. Since the stepped portions 21b with axial dimension that can be easily managed contacts the guide rails 15, deformation amount of the plastic collars 19 can be managed to restrict excess collapse of the plastic collars 19. Further, since the rigid stepped portions 21b contact the guide rails 15 to maintain axial force, fall of the axial force according to the deformation of the plastic collars 19 is reduced, and slack of the screws is restricted to be maintenance-free.

Since the plastic collar 19 is molded from plastic, friction coefficient is reduced compared to a metal and the weight of the collar is reduced.

Since the guide rails 15 are fixed to the plastic panel 4 by an adhesive, the number of elements for fixing the guide rails 15 is reduced, mounting of the guide rails 15 is facilitated, and the weight of the guide rails 15 is reduced. Since the guide rails 15 are not directly mounted on a vehicle body, the guide rails 15 can be commonly installed in a variety of types of vehicles.

The above described embodiment may be modified as follows.

In the aforementioned embodiment, the facing direction of the guide rails corresponds to the vehicle width direction. The direction may correspond to the vehicle longitudinal direction.

In the aforementioned embodiment, an opening-and-closing direction of the shading sheet 22 corresponds to the vehicle longitudinal direction. The direction may correspond to the vehicle width direction.

In the aforementioned embodiment, the sunshade 11 is applied for unshading and shading a fixed sunroof to let in light. The sunshade 11 may be applied to a slide sunroof or a flip-out type sunroof with a hinge.

In the aforementioned embodiment, the shading sheet 22 is rolled up by the retractors 23. The shading sheet 22 may be folded up in a concertina-like manner.

The sunshade 11 may be opened and closed by electric drive.

In the aforementioned embodiment, the frame 17 is fastened to the guide rails 15 by the stepped screws 21. The frame 17 may be fixed by rivets or pins.

In the aforementioned embodiment, the guide rails 15 are adhered and fixed to the plastic panel 4. The guide rails 15 may be integrally formed with the plastic panel 4 by insertion molding with the same material. Further, the guide rails 15 may be fixed to the plastic panel 4 by stud bolts embedded in the plastic panel 4.

In the aforementioned embodiment, the elongated holes 18 for allowing relative displacement extend only in the vehicle width direction 12. The elongated holes 18 may extend in a diagonal direction between the vehicle width direction 12 and the vehicle longitudinal direction 14.

In the aforementioned embodiment, the elongated holes 18 are formed in each of the opposite end portions 17*b* of the frame 17. The elongated holes 18 may be formed only in one of the end portions 17*b*, and the other end portion 17*b* may be fixed to prevent relative displacement thereof with respect to the guide rail 15. Even in this case, deformation of the plastic panel 4 is permitted. In this case, it is necessary to urge the garnish 24 asymmetrically, and the garnish 24 must not be centered. The shoe 33, which is moveable in the vehicle width direction 12, needs to be provided only at one of the end portions 24*c* of the garnish 24 on a side in which the relative displacement is permitted by the elongated holes 18.

In the aforementioned embodiment, the plastic panel 4 is provided separately from the roof panel 2. The plastic panel 4 and the roof panel 2 may be formed integrally.

The invention claimed is:

1. A sunshade for a vehicle, the vehicle having a roof, the sunshade for a vehicle comprising:
    a plastic panel configuring at least a part of the roof of the vehicle and including a translucent portion;
    a shading sheet for unshading and shading the translucent portion of the plastic panel;
    a pair of guide rails, wherein the guide rails are fixed to the plastic panel to face each other and extend in an opening-and-closing direction of the shading sheet to hold the shading sheet in a manner permitting the shading sheet to be opened and closed;
    a roll-up member for rolling up the shading sheet;
    a frame, which extends in a facing direction of the guide rails, links the guide rails to each other and holds the roll-up member;
    an elongated hole formed in at least one of end portions of the frame in the facing direction of the guide rails, wherein the elongated hole extends at least in the facing direction of the guide rails; and
    an engaging member inserted into the elongated hole, wherein the engaging member engages with the guide rails and the frame to permit relative movement of the guide rails and the frame at least in the facing direction of the guide rails.

2. The sunshade for a vehicle according to claim 1, wherein
    the frame engages with a central portion of the guide rails in a direction in which the guide rails extend,
    an elongation of the elongated hole extends only in the facing direction,
    the roll-up member is one of a pair of roll-up members, the shading sheet is one of a pair of shading sheets, and
    the pair of the roll-up members is held in the frame, which is single.

3. The sunshade for a vehicle according to claim 1, further comprising:
    a moving member cooperating with an edge portion of the shading sheet in the opening-and-closing direction; and
    an urging member accommodated in the moving member, the urging member urging the moving member toward one of the guide rails,
    wherein the urging member is configured to permit displacement of the guide rails in the facing direction caused by deformation of the plastic panel.

4. The sunshade for a vehicle according to claim 1, wherein
    the engaging member is a fastening member with a stepped portion and engages with the frame via a collar having a friction coefficient smaller than that of the fastening member, and
    the stepped portion contacts the guide rails.

5. The sunshade for a vehicle according to claim 4, wherein the collar is a plastic collar.

6. The sunshade for a vehicle according to claim 1, wherein the guide rails are adhered and fixed to the plastic panel.

* * * * *